(12) United States Patent
Smaak et al.

(10) Patent No.: US 10,270,655 B2
(45) Date of Patent: Apr. 23, 2019

(54) METHOD FOR RUNNING A COMPUTER NETWORK AND COMPUTER NETWORK

(71) Applicant: Robert Bosch GmbH, Stuttgart (DE)

(72) Inventors: Marc Smaak, Bergen op Zoom (NL); Marcel Versteeg, Papendrecht (NL); Stephan Van Tienen, Bergen op Zoom (NL); Tom De Brouwer, Breda (NL)

(73) Assignee: Robert Bosch GmbH, Stuttgart (DE)

( * ) Notice: Subject to any disclaimer, the term of this patent is extended or adjusted under 35 U.S.C. 154(b) by 13 days.

(21) Appl. No.: 15/546,484

(22) PCT Filed: Jan. 29, 2015

(86) PCT No.: PCT/EP2015/051770
§ 371 (c)(1),
(2) Date: Jul. 26, 2017

(87) PCT Pub. No.: WO2016/119847
PCT Pub. Date: Aug. 4, 2016

(65) Prior Publication Data
US 2018/0026844 A1 Jan. 25, 2018

(51) Int. Cl.
*H04L 12/24* (2006.01)
*H04L 12/42* (2006.01)
(Continued)

(52) U.S. Cl.
CPC .......... *H04L 41/0836* (2013.01); *H04L 12/42* (2013.01); *H04L 12/437* (2013.01); *H04L 12/462* (2013.01)

(58) Field of Classification Search
None
See application file for complete search history.

(56) References Cited

U.S. PATENT DOCUMENTS

| | | | |
|---|---|---|---|
| 6,262,977 B1 * | 7/2001 | Seaman | H04L 12/2852 370/254 |
| 8,194,534 B2 | 6/2012 | Pandey et al. | |

(Continued)

FOREIGN PATENT DOCUMENTS

| | | |
|---|---|---|
| CN | 102821050 | 12/2012 |
| WO | 2014044303 | 3/2014 |

OTHER PUBLICATIONS

International Search Report for Application No. PCT/EP2015/051770 dated Oct. 15, 2015 (3 pages).

(Continued)

*Primary Examiner* — Brian S Roberts
(74) *Attorney, Agent, or Firm* — Michael Best & Friedrich LLP

(57) ABSTRACT

In a method for running a computer network (2) comprising a number of devices (4a-d) being arranged in a daisy-chained loop and running a spanning-tree algorithm (10) involving handling of state machines (14), wherein each device (4a-d) comprises a bridge (6a-d) having at least three ports (8a-c), whereby during running the network (2) each device (4a-d) can take different states (D, L, F, O) to avoid a loop in the network (2), whereby logical port states (D, L, F, O) of the ports are defined by the state machines (14), for at least one device (4a-d) at least once before a reboot of the device (4a-d) a momentary state (S) of a state machine (14) is stored, and in case of rebooting the state (D, L, F, O, S) of the device (4a-d) is restored, if it is successfully validated that the stored state (S) is still valid. A Computer network (2), comprising a number of devices (4a-d) being arranged in a daisy-chained loop is adapted for performing the method above.

9 Claims, 2 Drawing Sheets

(51) Int. Cl.
*H04L 12/437* (2006.01)
*H04L 12/46* (2006.01)

(56) References Cited

U.S. PATENT DOCUMENTS

| | | | | |
|---|---|---|---|---|
| 2004/0017770 A1* | 1/2004 | Higashiyama | ........ | H04L 12/462 370/223 |
| 2005/0198232 A1* | 9/2005 | Haalen | ................ | H04L 41/082 709/221 |
| 2007/0159987 A1* | 7/2007 | Khan | ..................... | H04L 45/00 370/256 |
| 2007/0159988 A1 | 7/2007 | Khan et al. | | |

OTHER PUBLICATIONS

Janiszweski, M., et al., "Recovery Time of Redundant Ethernet-Based Networked Audio Systems," AES Convention 128, May 2010, AES, 60 East 42nd Street, Room 2520 New York 10165-2520, USA, May 1, 2010, XP040509421.

* cited by examiner

METHOD FOR RUNNING A COMPUTER NETWORK AND COMPUTER NETWORK

BACKGROUND OF THE INVENTION

The invention provides for a method for running a computer network with a number of devices arranged in a daisy chained loop. Furthermore, the invention provides for such a computer network.

One kind of computer network is an Ethernet network. Ethernet networks cannot handle loops. Standard protocols, like Spanning Tree Protocol (STP) and Rapid Spanning Tree Protocol (RSTP), detect loops and isolate both ends of the loops. It can take some time before loops are detected. There is no undisturbed communication until the network topology is correctly detected.

Media networks can require a daisy-chained solution for its end devices to allow different wiring schemes. Redundancy is an important feature for media networks. Therefore, it must be possible to create a loop with a chain.

Document WO 2014 044 303 A1 provides for a method for running a computer network and such a computer network. The computer network comprises a number of devices being arranged in a stable daisy-chained loop, wherein each device comprises a bridge having at least three ports, whereby during running the computer network each device can take different states to avoid a loop, and whereby in case of rebooting the ports of at least one of the devices keep their current port states.

SUMMARY OF THE INVENTION

According to the invention, a method is for running a computer network, especially an Ethernet network. The computer network comprises a number of devices, the devices being arranged in a daisy-chained loop, the devices running a spanning-tree algorithm, whereby running a spanning tree algorithm involves handling of state machines, wherein each device comprises a bridge— or switch—, the bridge having at least three ports. The third port is adapted to receive traffic from and transmit traffic to the computer network. During running the network each device can take different states to avoid a loop in the network. The logical states of the ports are defined by the state machines. For at least one device at least once before a reboot of the device a momentary state of at least one of the state machines is stored. In case of rebooting of the device the following action is performed: it is validated, if the stored state is still valid; if the validation is successful, i.e. if the stored state is still valid, then the state of the device is restored.

The method provides at least a chance to restore at least parts of the device states, especially the port states that existed before rebooting without the need to run the spanning-tree algorithm. A benefit of the method is that the daisy chained loop is stable even in case devices in the chain are performing a soft reboot. The states and information are stored persistently in so far, to be available at least until after reboot. Different states of the device include any combination of logical port states, especially "discarding", "learning", "forwarding", "disabled", and/or physical port states, especially "up" and "down", and/or states of state machines. Stored information is especially related to ports only that are momentarily (when storage takes place) in the logical port state "forwarding" or "blocking". Restored logical port states include "forwarding" or "blocking" or "learning".

The method is based on the following considerations:

A computer network is a collection of computers and other components interconnected by communication channels. These channels allow for sharing of resources and information. Computer networks can be classified according to a variety of characteristics as the medium used, communication protocols, scale, topology, and organizational scope.

Ethernet networks are frame-based computer networks for local area networks. It is to be noted that Ethernet networks cannot handle loops. If a loop is created, packets will continuously be communicated over the loop. Loops are usually created for cable and equipment redundancy using Ethernet switches. Devices are usually star-wired to the switches.

Standard protocols are developed to detect loops and isolate both ends of the loops. The best known protocols are Spanning Tree Protocol (STP) and Rapid Spanning Tree Protocol (RSTP) but other, sometimes proprietary, solutions exist. When the network topology changes, detection is restarted to avoid creation of unconnected parts of the network or new loops. It can take some time before loops are detected. To avoid overload of the network by circling packets, the default in loop detection protocols is that there is no forwarding of packets on a newly established link. This means that there is no communication until the network topology is correctly detected.

The Spanning Tree Protocol (STP) is a network protocol that ensures a loop-free topology for bridged Ethernet networks. STP is adapted to prevent bridge loops and broadcast radiation. For this, it creates a spanning tree within a mesh network of connected layer-2-bridges, e.g. Ethernet switches, and disables those links that are not part of the spanning tree, leaving a single active path between any two network nodes.

The Rapid Spanning Tree Protocol (RSTP) provides for significantly faster spanning tree convergence after a topology change introducing new convergence behavior and bridge port rules.

STP takes typically more than 30 seconds to recreate the network topology, RSTP takes typically less than 2 seconds.

Media networks can require a daisy-chained solution for its end devices. This is solved in a standard way by adding an Ethernet switch with at least three ports to each device. A specified (by the maximum age value of RSTP/STP when running RSTP and or application jitter tolerance) maximum of devices can be daisy chained. Redundancy is an important feature for media networks. Therefore, it must be possible to create a loop with a chain. Each device in the media network is an end device, for example but not limited to a loudspeaker, DSP device, etc.

Daisy chain is a wiring scheme in which multiple devices are wired together in a sequence or in a ring. Each of the network devices includes an upstream port and a downstream port where each port is coupled to at least one cable. A third port in each device is adapted to receive traffic from and transmit traffic to the network.

Each device can take different port states during running the computer network, e.g. forwarding and blocking port state. It is to be noted that during rebooting the device will not actively support RSTP neither STP; it will still filter out the management data packets but does not have a way to process the messages or to send updates. It is assumed that the device had the correct port state before rebooting. It is also assumed that no more than one significant change in a network segment occurs during rebooting. It is assumed rebooting does not take longer than 3 times the management packets transmit cycle or management packets alive packets (hello time). It is assumed that a device is not longer than 3 times the hello time not able to run the RSTP and/or STP protocol Supporting STP and/or RSTP involves handling of state machines on bases of different input. Inputs are timers and information extracted from received Bridge Protocol Data Units (BPDUs). A state machine (also "finite state machine") is a mathematical model of computation. It models an abstract machine that can be in different states, one state at a time.

For communication between switches, the so-called Bridge protocol is used. Packets of the protocol are BPDUs. To ensure that each bridge has enough information to draw conclusions, BPDUs are exchanged. A bridge sends a BPDU frame using the unique identifier of the port itself as a source address. BPDUs are sometimes also referred to as layer 2 management data.

The protocol is setup in such way that the information sent in each BPDU is stateless, this means that BPDUs may be missed/dropped, as long as the timers are not elapsed. Typically one out of 3 BPDUs must be processed in order to keep the logical network topology stable.

The time between 2 BPDUs is defined as the hello time and can be any value between 2 and 10 seconds according to the specification. This value must be configured system wide.

The RSTP and STP logical port and physical port states are:

"Discarding" (RSTP)/"Blocking\Listening" (STP), associated with the physical port state "up", meaning the switch processes management data and awaits information.

"Learning" (RSTP and STP), associated with the physical port state "up", meaning the port does learn source addresses of any incoming data.

"Forwarding" (RSTP and STP), associated with the physical port state "up", meaning the port receives and sends data.

"Disabled", (RSTP and STP), associated with the physical port state "down", meaning the switch processes no information (can be done by network administrator).

RSTP and STP logical port states are defined by state machines of the STP or RSTP protocol and typically set in a hardware interface to be able to perform the action in the description. A logical port state can also be read out from the hardware device.

It will be understood that the features mentioned above and those described hereinafter can be used not only in the combination specified but also in other combinations or on their own, without departing from the scope of the invention.

In case a device is started or restarted, the logical port states from the spanning tree algorithm are cleared. It will take seconds before this state is re-learned from the neighboring devices. In case of a simple reset of a device the communication path to any device that is after this device in the spanning tree, as seen from the root bridge, will be lost for a long period. Especially in a system that transports IP media streams, this is loss of core functionality. This is being avoided by implementing the following solution.

Once before a reboot, e.g. in the pre-shutdown phase, the device can store persistently the current states of necessary state machines, especially including all information received via BPDUs such as but not limited to root bridge information and root path cost as well as the logical port states.

In case no pre-shutdown phase is available the device can store the states on a regular interval, preferably every hello time or immediately after receiving a BPDU.

According to the RSTP/STP specification a device will issue a topology change when it misses 3 BPDUs. In a worst case scenario, the rebooting device was about to send a BPDU when it reboots. This means that RSTP/STP must be up and running within 2 times the hello time after reboot to prevent entering the spanning tree protocol. Alternatively, the device could send out a BPDU first before it reboots since this reboot is normally planned, and send out a BPDU once the device is booted. This increases the available reboot time to 3 times the hello time.

To further reduce the risk of unnecessary topology changes (entering the spanning tree protocol) after a reboot the received info timer can be set to a maximum to allow neighboring devices a maximum reboot time, this would as well help when multiple neighboring devices asynchronously start the soft reboot process. This is a solution when all device in the chain reboot at about the same time e.g. due to a firmware update.

Once the device is restarting it should not default the logical port state, as it does after a powerup, in case the device detected a soft reset and it knows the RSTP or STP will be started later on in the initialization process. It should not be restored when the device has a powerup instead of a reboot. When the power is removed from the devices in the chain the assumption that there is no change to the network topology is less likely.

The RSTP/STP stack should check during startup whether any information, e.g. states, were previously (before reboot) stored. In case the information is available, it should convert the state of the state machines to the stored state as far as possible after appropriate validation tests.

The RSTP/STP stack should validate if the stored states, i.e. the stored values, are still valid. This might be performed by a persistency check of the soft/hard reset value and/or by a persistency check between stored logical values in the state machines and the physical port state.

The validation can be any of the following items or a combination of the following items but not limited to and should be repeated for every port: In case the physical port is in "down" state and the stored logical state for this port does not match the "disabled" logical state it should not restore the state machine information.

In case the physical port is in "down" state, and the logical state in the hardware device does not match the "disabled" logical state it should not restore the state machine information.

In case the physical port is in "down" state, the logical state stored and the logical state in the hardware devices matches the "disabled" logical state it is allowed to restore the state machine information for this port.

In case the physical port is in the "up" state and the stored logical state is "disabled" it should not restore the state machine information.

Normally the states are restored if the stored information for all ports is valid. In case it is allowed to restore the state machine information for all ports, the RSTP/STP application should actually restore all state machine information, if any ports are changed, the restoration logic should decide for which ports it is safe to restore the state and do so, the other ports should be set to default.

When soft rebooting one device in a system with RSTP enabled working according to the invention, there will be only stream data loss for this device and any device which uses this device as source. Without using the invention there were streaming media data loss for all devices which uses this audio path. Streaming media is most likely an audio stream.

In a preferred embodiment running the spanning-tree algorithm involves handling of the state machines on basis of network protocol information. The momentary state includes information received via network protocol information. Especially the information is received via BPDUs. Especially all information received via BPDUs is stored. This embodiment enables to evaluate BPDU information from a time before reboot even at a time after reboot.

In a preferred embodiment the momentary state is stored in a pre-shutdown phase. This can be done, if it is known that a shutdown will take place. Hence, information can be saved as late as possible, minimizing the probability of network amendments before end of the reboot and maximizing the possibility that stored states are still valid after reboot.

In a preferred embodiment the momentary state is stored on a regular time interval. This enables the availability of stored information, even if unexpected or unforeseeable reboots take place, especially in case of the absence of a pre-shutdown phase.

In a preferred embodiment the stored state of the device is not restored, if a conflict between an actual value and the stored state is detected. Actual values may be values of each information available and suitable for consistency checks, e.g. actual or stored state machine states, logical or physical port states. This avoids a network configuration that might cause network failures.

In a preferred embodiment the conflict is determined as a discrepancy between the stored and an actual logical and/or physical state of a port. Reasons for such conflicts are especially, since a network cable of the device is removed or added in-between storing the values and retrieving them, especially during reboot. Another possibility is that the hardware switching part has been reset within the time span mentioned above.

In a preferred embodiment it is validated that the stored state is still valid in that either of or a combination of the following is performed:
  it is validated, if a soft or hard reset has been performed: the logical port state is not updated in case the device detected a soft reset and it knows the spanning-tree algorithm will be started later on, within 3 times the hello time, in the initialization process.
  a persistency check between stored logical values in the state machines and the physical state is performed,
  In case the physical port is in "down" state and the stored logical state for this port does not match the "disabled" logical state, the state machine information is not restored,
  In case the physical port is in "down" state, and the logical state in the hardware device does not match the "disabled" logical state, the state machine information is not restored,
  In case the physical port is in "down" state, the logical state stored and the logical state in the hardware devices matches the "disabled" logical state, it is allowed to restore the state machine information for this port,
  In case the physical port is in "up" state and the stored logical state is "disabled" the state machine information is not restored.
  In case the physical port is in "up" state and the stored logical state is not "discarding" it is allowed to restore the state machine information for this port.

The above validations should be repeated for every port. In case it is allowed to restore the state machine information for all ports, the RSTP/STP application should actually restore all state machine information, if any ports are changed, the restoration logic should decide for which ports it is safe to restore the state and do so, the other ports should be set to default.

This embodiment enables for the detection and appropriate reaction on most of the situations that normally occur during reboot.

In a preferred embodiment each device takes different states by changing logical states of its ports, whereby as a momentary information the momentary logical states of the ports are stored, whereby as a state of the device the logical state of the ports are restored according to the following validation scheme:
a) is a next port to be checked available?
b1) if yes, go to c)
b2) if no, restore the state machine information and run the network,
c) is the physical port in "up" state?
d1) if yes, go to e)
d2) if no, go to g)
e) is the stored logical port state "disabled"?
f1) if yes, do not restore the state machine information and run the network,
f2) if no, go to a)
g) is the stored logical state "disabled"?
h1) if yes, go to i)
h2) if no, do not restore the state machine information and run the network,
i) is the logical port state in the hardware device set to "disabled"?
j1) if yes, go to a)
j2) if no, do not restore the state machine information and run the network.

To not restore the state machine information is the default action to be taken in all other scenarios not covered by the steps above.

This embodiment enables for a secure restoration of logical port states in all situations.

According to the invention a computer network, comprising a number of devices, the devices being arranged in a daisy-chained loop, is adapted for performing a method according to the invention as explained above.

DETAILED DESCRIPTION

Figure 1:
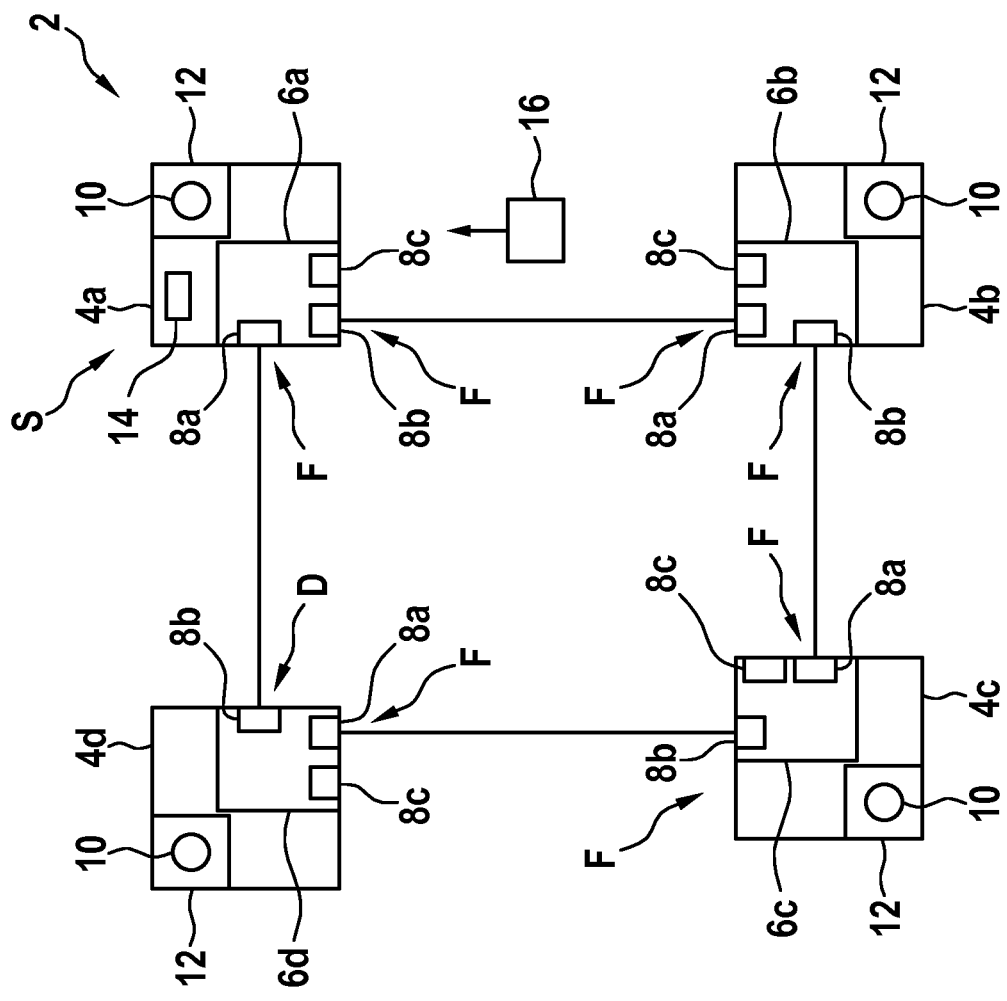
FIG. 1 shows a computer network.

It will be understood that the features mentioned above and those described hereinafter can be used not only in the combination specified but also in other combinations or on their own, without departing from the scope of the invention.

The invention is diagrammatically illustrated in the drawings by means of embodiments by way of example, and is hereinafter explained in detail with reference to the drawings. It is understood that the description is in no way limiting on the scope of the present invention and is nearly an illustration of embodiments of the invention.

FIG. 1 shows a computer network 2 that comprises four devices 4a-d, arranged in a daisy chained loop. Each device 4a-d comprises a bridge 6a-d. Each bridge 6a-d has three ports 8a-c. Each device runs a spanning tree algorithm or protocol 10, indicated symbolically by a circle, in a controller 12. During running the network each device takes different states to avoid a closed loop in the network 2. In the present example these are the states "discarding" D, "learning" L, "forwarding" F and "disabled" O. Device 4*b* is acting as root bridge in FIG. 1. To avoid a loop the network connection between devices 4*a* and 4*d* is interrupted by putting port 8*b* of device 4*d* in "discarding" state D. All other ports 8*a,b* are in "forwarding" state F. Ports 8*c* are in an appropriate state to be connected to various other components (not shown) and not important to the invention.

Exemplarily for all devices in device 4*a* a state machine 14 contained therein is shown. The state machine can take different states S. The state machines work based on network protocol information 16, supplied to them, BPDUs in the example.

Figure 2:
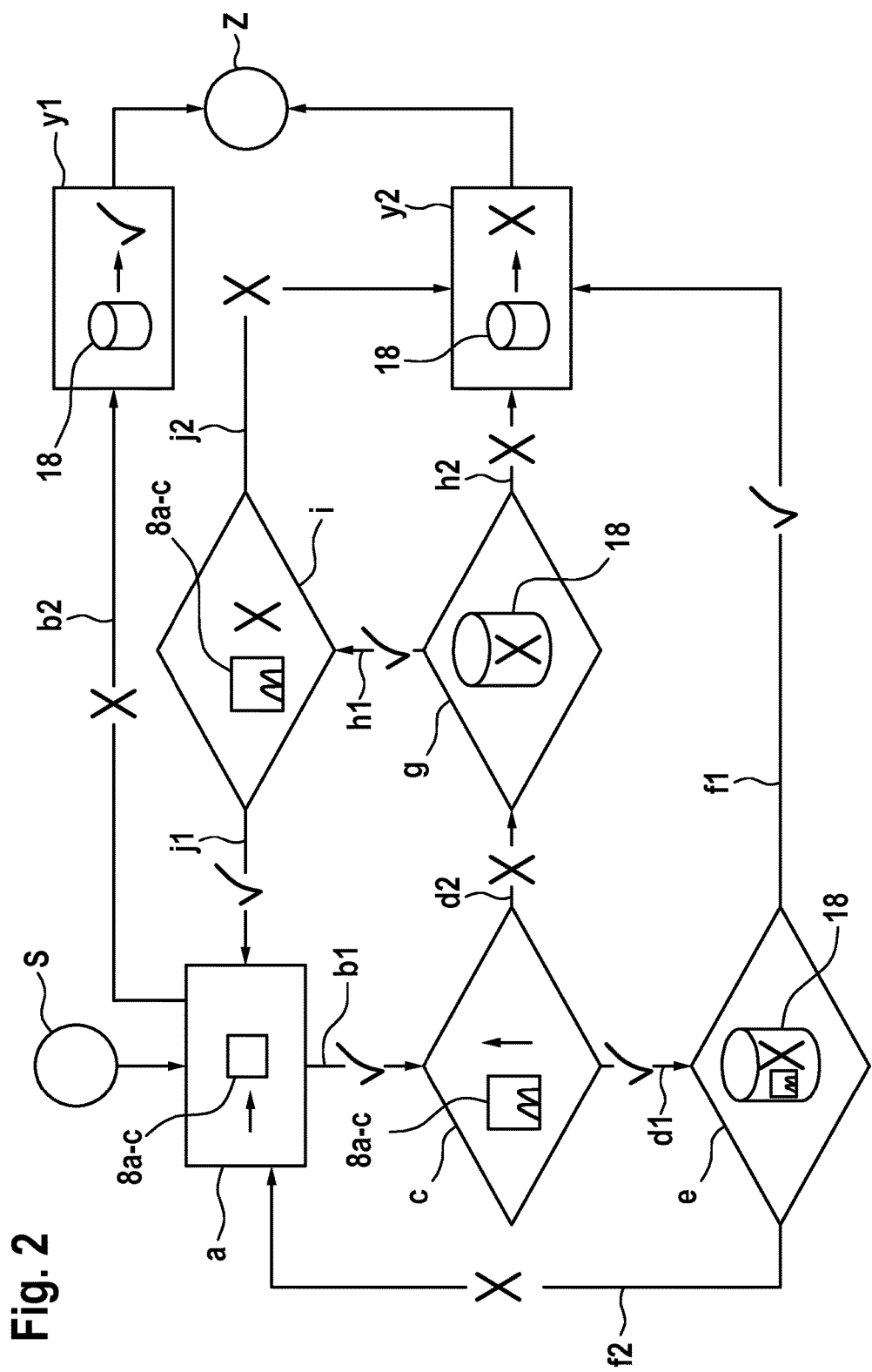
FIG. 2 shows a restoration flow chart.

FIG. 2 shows a restoration flow chart, which could be implemented as validation.

Validation starts with step s).

In a step a) it is evaluated, if a next port 8*a-c* that is not yet checked within this validation procedure and that is still to be checked is available. If "yes" it is proceeded along path b1 to step c). If "no", it is proceeded along path b2 to steps y1) and z).

In step c) it is evaluated, if the physical port 8*a-c* state is "up". If "yes" it is proceeded along path d1 to step e). If "no" (physical port is "down"), it is proceeded along path d2 to step g.

In step e) it is evaluated, if the stored logical port state is "disabled". The storage is depicted by a symbol of a storage medium 18, e.g. a memory in the controller 12, on which the momentary information is stored. If "yes" it is proceeded along path f1 to steps y2) and z). If "no", it is proceeded along path f2 to step a).

In step g) it is evaluated, if the stored logical state is "disabled". If "yes" it is proceeded along path h1 to step i). If "no", it is proceeded along path h2 to steps y2) and z).

In step i) it is evaluated, if the logical port state in the hardware device is set to "disabled". If "yes" it is proceeded along path j1 to step a). If "no", it is proceeded along path j2 to steps y2) and z).

In step y1) the state machine information is restored.

In step y2) the state machine information is not restored, which is also the default action to be taken in any case not covered by the steps above.

In step z) the network is run.

The invention claimed is:

1. A method for running a computer network having a number of devices arranged in a daisy-chained loop, the method comprising:
   running a spanning-tree algorithm on the devices, whereby running a spanning tree algorithm includes handling of state machines;
   wherein each device comprises a bridge, the bridge having at least three ports;
   whereby during running the network each device can take different states to avoid a loop in the network;
   whereby logical port states of the ports are defined by the state machines;
   whereby for at least one device at least once before a reboot of the device a momentary state of a state machine is stored; and
   restoring the state of the device to the momentary state at reboot in response to determining that the stored state is still valid.

2. The method according to claim 1, whereby running the spanning-tree algorithm includes handling of the state machines on basis of network protocol information, whereby the stored momentary state of a state machine includes information received via network protocol information.

3. The method according to claim 1, whereby the momentary state is stored in a pre-shutdown phase.

4. The method according to claim 1, whereby the momentary state is stored on a regular time interval.

5. The method according to claim 1, whereby the state of the device is not restored in response to determining if an actual value and the stored state conflict.

6. The method according to claim 5, wherein the actual value and the stored state conflict if there is a discrepancy between the stored state and at least one of an actual logical state and a physical state of a port.

7. The method according to claim 1, wherein determining if the stored state is still valid includes at least one of the following:
   it is validated, if a soft or hard reset has been performed: the logical port state is not updated in case it is detected that a soft reset had taken place and it is known that the spanning-tree algorithm will be started later on in the initialization process,
   a persistency check between stored logical values in the state machines and the physical state is performed,
   In case the physical port state is "down" and the stored logical state for this port does not match the "disabled" logical state, the state machine information is not restored,
   In case the physical port state is "down", and the logical state in the hardware device does not match the "disabled" logical state, the state machine information is not restored,
   In case the physical port state is "down", the logical state stored and the logical state in the hardware devices matches the "disabled" logical state, it is allowed to restore the state machine information for this port,
   In case the physical port state is "up" and the stored logical state is "disabled" the state machine information is not restored.

8. The method according to claim 1, wherein each device takes different states by changing logical states of its ports, whereby as a momentary state the momentary logical states of the ports are stored, whereby as a state of the device the logical state of the ports are restored according to the following validation scheme:
   a) is a next port to be checked available?
   b1) if yes, go to c)
   b2) if no, restore the state machine information and run the network,
   c) is the physical port state "up"?
   d1) if yes, go to e)
   d2) if no, go to g)
   e) is the stored logical port state "disabled"?
   f1) if yes, do not restore the state machine information and run the network,
   f2) if no, go to a)
   g) is the stored logical state "disabled"?
   h1) if yes, go to i)
   h2) if no, do not restore the state machine information and run the network,
   i) is the logical port state in the hardware device set to "disabled"?
   j1) if yes, go to a)
   j2) if no, do not restore the state machine information and run the network,
   whereby the default is to not restore the state machine information.

9. A computer network, comprising a number of devices, the devices being arranged in a daisy-chained loop, wherein a computer of the computer network is configured to run a spanning-tree algorithm on the devices, whereby running a spanning tree algorithm includes handling of state machines;
wherein each device comprises a bridge, the bridge having at least three ports;
whereby during running the network each device can take different states to avoid a loop in the network;
whereby logical port states of the ports are defined by the state machines;
whereby for at least one device at least once before a reboot of the device a momentary state of a state machine is stored; and
restoring the state of the device to the momentary state at reboot in response to determining that the stored state is still valid.

* * * * *